(12) United States Patent
Sundholm et al.

(10) Patent No.: US 10,274,008 B2
(45) Date of Patent: Apr. 30, 2019

(54) AXIAL LOAD BEARING ASSEMBLY

(71) Applicant: STEERING SOLUTIONS IP HOLDING CORPORATION, Saginaw, MI (US)

(72) Inventors: Brad S. Sundholm, Bay City, MI (US); Jason Rutkiewicz, Freeland, MI (US); Nik von Matt, Midland, MI (US); Robert E. Beyerlein, Hemlock, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 280 days.

(21) Appl. No.: 15/181,937

(22) Filed: Jun. 14, 2016

(65) Prior Publication Data
US 2016/0368526 A1 Dec. 22, 2016

Related U.S. Application Data (60) Provisional application No. 62/182,111, filed on Jun. 19, 2015.

(51) Int. Cl.
*F16C 25/08* (2006.01)
*B62D 3/04* (2006.01)
(Continued)

(52) U.S. Cl.
CPC .............. *F16C 25/083* (2013.01); *B62D 3/04* (2013.01); *B62D 5/0409* (2013.01);
(Continued)

(58) Field of Classification Search
CPC ...... B62D 3/04; B62D 5/0403; B62D 5/0454; F16C 19/527; F16C 2240/14;
(Continued)

(56) References Cited

U.S. PATENT DOCUMENTS 3,516,717 A * 6/1970 Peterson ................. F01D 25/16
                                                    384/517
3,761,100 A * 9/1973 Taylor ...................... F16J 15/38
                                                    277/373
(Continued)

FOREIGN PATENT DOCUMENTS

CN          1599680 A      3/2005
CN        101454593 A      6/2009
(Continued)

OTHER PUBLICATIONS

"Spring Washers Information" Engineering 360 (2018) 7 Pages, Retrieved from the Internet Mar. 12, 2018, www.globalspec.com/learnmore/mechanical_components/springs/washer_springs.
(Continued)

*Primary Examiner* — Joseph M Rocca
*Assistant Examiner* — Maurice L William
(74) *Attorney, Agent, or Firm* — Cantor Colburn LLP (57) ABSTRACT

An axial load bearing assembly that may be for a steering gear box apparatus includes a first member, a second member, a jacket, and an elastomeric ring. The first member includes a first surface facing axially with respect to a centerline. The second member is constructed and arranged to move axially with respect to the first member between an extended state and a compressed state. The second member includes a second surface that axially opposes the first surface. The jacket is engaged to one of the first and second members, and includes a face facing radially inward. The elastomeric ring is disposed axially between the first and second members for axial compression, and is in biased contact with the face at least when in the compressed state preventing radial expansion of the elastomeric ring during axial compression.

17 Claims, 8 Drawing Sheets

(51) Int. Cl.
 B62D 5/04 (2006.01)
 F16H 1/16 (2006.01)
(52) U.S. Cl.
 CPC ......... B62D 5/0421 (2013.01); B62D 5/0454 (2013.01); F16H 1/16 (2013.01)
(58) Field of Classification Search
 CPC . F16C 25/083; F16C 39/02; F16H 1/16; F16J 15/16; F16J 15/32; F16J 15/3208; F16J 15/3216; F16J 15/3436
 See application file for complete search history.

(56) References Cited

U.S. PATENT DOCUMENTS

| | | | |
|---|---|---|---|
| 5,145,427 A | 9/1992 | Kawai et al. | |
| 5,238,233 A | 8/1993 | Hein | |
| 5,290,047 A * | 3/1994 | Duffee | F16C 33/80 277/419 |
| 5,722,299 A | 3/1998 | Yamamoto et al. | |
| 5,829,306 A | 11/1998 | Komakazi et al. | |
| 6,158,896 A * | 12/2000 | Zernickel | F16C 33/60 384/506 |
| 7,163,206 B2 * | 1/2007 | Cross | F02K 1/004 277/379 |
| 7,217,106 B2 | 5/2007 | Tanaka et al. | |
| 7,800,265 B2 | 9/2010 | Nishikawa et al. | |
| 8,602,656 B2 | 12/2013 | Mashino et al. | |
| 8,998,189 B2 | 4/2015 | Toyama et al. | |
| 2003/0012473 A1 * | 1/2003 | Lutz | F16C 19/166 384/537 |
| 2005/0238510 A1 * | 10/2005 | Mitsuda | F04D 29/588 417/423.1 |
| 2013/0170775 A1 * | 7/2013 | Cymbal | F16C 33/30 384/456 |
| 2014/0023302 A1 * | 1/2014 | Sundholm | F16C 25/04 384/456 |
| 2014/0224567 A1 * | 8/2014 | Kiforiuk | B62D 5/0448 180/444 |
| 2016/0003361 A1 * | 1/2016 | Takahashi | F16J 15/342 277/377 |
| 2016/0003362 A1 * | 1/2016 | Suefuji | F16J 15/348 277/377 |
| 2016/0025144 A1 * | 1/2016 | Giroud | F16C 25/083 384/448 |

FOREIGN PATENT DOCUMENTS

| | | |
|---|---|---|
| CN | 102398628 A | 4/2012 |
| CN | 202847793 U | 4/2013 |
| DE | 102009040445 A1 | 3/2010 |
| JP | 01210607 A | 8/1989 |
| KR | 20050094955 | 9/2005 |
| KR | 100764230 | 10/2007 |
| KR | 20110073848 A | 6/2011 |
| KR | 20140015106 A * | 2/2014 |
| WO | 2007119876 A1 | 10/2007 |
| WO | 2014017718 A1 | 1/2014 |

OTHER PUBLICATIONS 65-70 Bumper Bolt Wave Washer, Drake Automotive Group, 3 Pages, Retrieved from the Internet Apr. 13, 2018, http://www.virginiaclassicmustang.com/65-70-BUMPER-BOLT-WAVE-WASHER-P2197.aspx.
English Translation of Chinese Office Action and Search Report for Chinese Application No. 201610620415.8 dated Jan. 31, 2018, 14 pages.

* cited by examiner

AXIAL LOAD BEARING ASSEMBLY

CROSS-REFERENCE TO RELATED APPLICATION

This patent application claims priority to U.S. Provisional Patent Application Ser. No. 62/182,111, filed Jun. 19, 2015 which is incorporated herein by reference in its entirety.

BACKGROUND OF THE INVENTION

The present disclosure relates to axial load bearing assemblies, and more particularly, to an axial load bearing assembly that includes a resilient ring providing a plurality of force characteristics along an axial range of travel.

Existing axial load bearing assemblies such as bearing isolator assemblies seek to absorb manufacturing tolerances of associated components, pre-load bearings with axial loads to eliminate looseness and unwanted bearing noise, and control worm travel and rate of deceleration. Absorption of manufacturing tolerances of worm and bearing assemblies may be accomplished while limiting travel of the components by modulating a quantity of elastomer disposed within a pair of steel cups such that the elastomer compensates for part-to-part dimensional variations. In accordance with such methods, the shape of the cups and the shape of the elastomer are such that a specific force curve is generated when the assembly is compressed. Bearing pre-load is sought to be accomplished by applying an axial force to the inner race and resisting that force on the opposite side of the bearing on the outer race. Worm travel is controlled when the elastomer becomes incompressible (i.e., hydraulic lock inside steel cups), and retention of conventional assemblies is provided through use of adhesives.

Unfortunately, such conventional bearing isolators may be limited in their ability to provide sufficient range of travel together with desirable force characteristics. Such bearing isolators may also lack the ability to be tuned so as to provide desirable force characteristics through necessary ranges of travel along the worm axis. Accordingly, it is desirable to have an axial load bearing assembly providing tunable force characteristics over an increased range of travel.

SUMMARY OF THE INVENTION

In one exemplary embodiment of the present disclosure, an axial load bearing assembly that may be for a steering gear box apparatus includes a first member, a second member, a jacket, and an elastomeric ring. The first member includes a first surface facing axially with respect to a centerline. The second member is constructed and arranged to move axially with respect to the first member between an extended state and a compressed state. The second member includes a second surface that axially opposes the first surface. The jacket is engaged to one of the first and second members, and includes a face facing radially inward. The elastomeric ring is disposed axially between the first and second members for axial compression, and is in biased contact with the face at least when in the compressed state preventing radial expansion of the elastomeric ring during axial compression.

In another exemplary embodiment, an axial bumper device includes a first member, a second member, a resilient member, and a corrugated ring. The first member extends about a centerline, and the second member is axially opposed to the first member and is constructed and arranged to move axially with respect to the first member. The resilient member is axially disposed between, and in biasing contact with, the first and second members. The corrugated ring is axially disposed between, and in biasing contact with, the first and second members.

In yet another exemplary embodiment, an electric power steering gear box apparatus for a vehicle includes an outer casing, an electric motor, a worm shaft gear, and an axial load bearing assembly. The electric motor is supported by the outer casing and includes a motor shaft configured to rotate about a centerline. The worm shaft gear is rotatably supported by the outer casing and connects to the motor shaft. The worm shaft gear is constructed and arranged to shift axially with respect to the motor shaft. The axial load bearing assembly includes a base portion, a base segment, a wave-form o-ring, and a jacket. The base portion is in fixed axial relation to one of the outer casing and the worm shaft gear. The base segment is in fixed axial relation to the other of the outer casing and the worm shaft gear. The wave-form o-ring is disposed axially between the base portion and the base segment for compression. The jacket projects axially outward from one of the base portion and the base segment and toward the other of the base portion and the base segment. The wave-form o-ring is in biased contact with a circumferentially continuous face of the jacket that faces radially inward.

These and other advantages and features will become more apparent from the following description taken in conjunction with the drawings

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
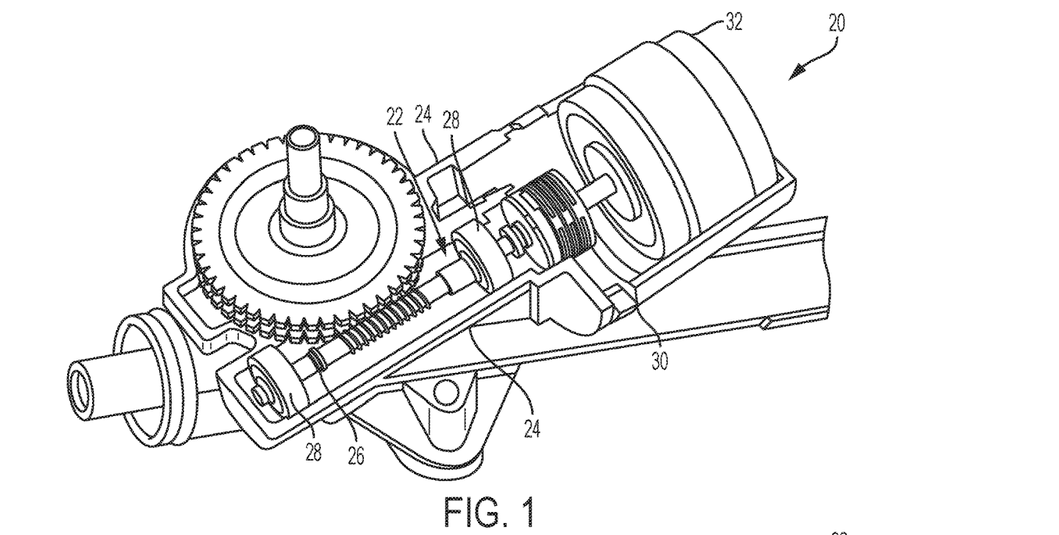
FIG. 1 is a perspective cross section of a steering gear box apparatus as one application of an axial bumper device in accordance with an exemplary embodiment of the present disclosure.

Referring now to the Figures, where the invention will be described with reference to specific embodiments, without limiting same, an electric power steering gear box apparatus 20 is illustrated as one, non-limiting, application of an axial bumper device 22 that may be a bearing isolator device. Although not illustrated, the gear box apparatus 20 may be applied to a single pinion electric power steering system or a column electric power steering system as is known in the art. The steering gear box apparatus 20 may include the bearing isolator device 22, an outer casing 24, a worm gear shaft 26, and a bearing 28 (two illustrated) for rotatably supporting the worm gear shaft 26. The bearings 28 may be engaged to the casing 24 and allow for limited axial movement of the worm gear shaft 26 relative to the casing 24 and the bearings 28. A rotating motor shaft 30 of the gear box apparatus 20 is connected axially between the worm gear shaft 26 and an electric motor 32 of the gear box apparatus 20. The connection between the worm gear shaft 26 and the motor shaft 30 may be splined allowing for limited axial movement between the two shafts 26, 30.

Figure 2:
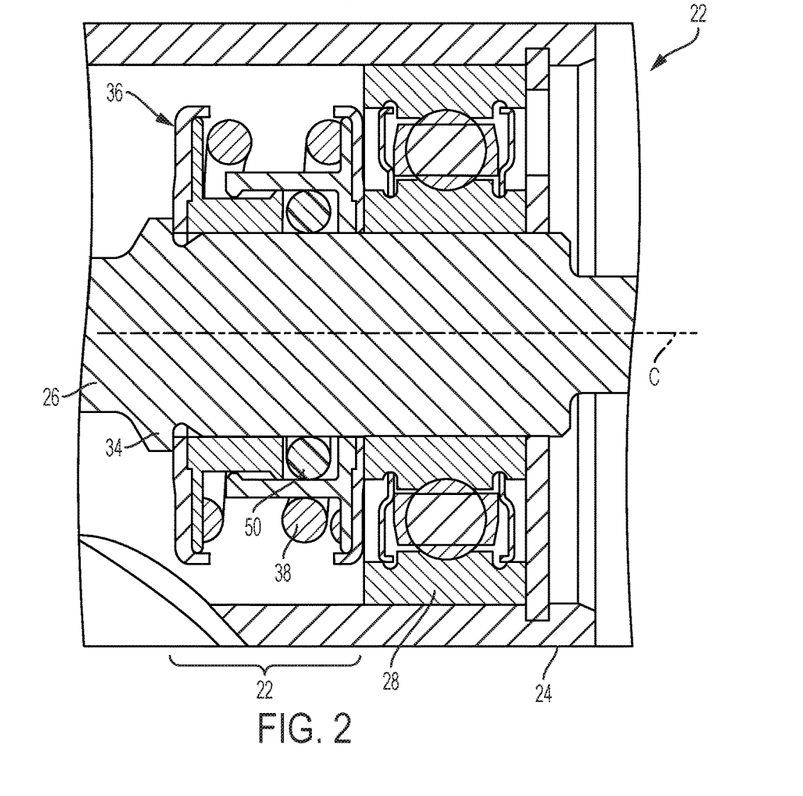
FIG. 2 is a partial cross section of the steering gear box apparatus illustrating the axial bumper device utilized as a bearing isolator device and axially located adjacent to a bearing of the steering gear box apparatus, and taken from circle 2 of FIG. 1.

Referring to FIG. 2, the axial bumper device 22 is illustrated as a bearing isolator device as one, non-limiting, example. The bearing isolator device 22, the worm gear shaft 26, and the bearing 28 are concentrically located about a centerline C that may be a rotational axis. The bearing 28 may be held substantially fixed to the casing 24 and facilitates substantially frictionless rotation of the worm gear shaft 26. The bearing isolator device 22 may be disposed between and axial abuts a flange 34 that projects radially outward from the worm gear shaft 26, and the bearing 28. In operation, the worm gear shaft 26 may axial shift to a limited degree causing the flange 34 to move axially toward and away from the bearing 28. As flange 34 moves toward the bearing 28, the bearing isolator device 22 may be resiliently compressed there-between. It is contemplated and understood that the worm gear shaft 26 may be any rotating shaft, and the flange 34 is but one example of an axial stop that facilitates the axial compression of the bearing isolator device 22.

Figure 3:
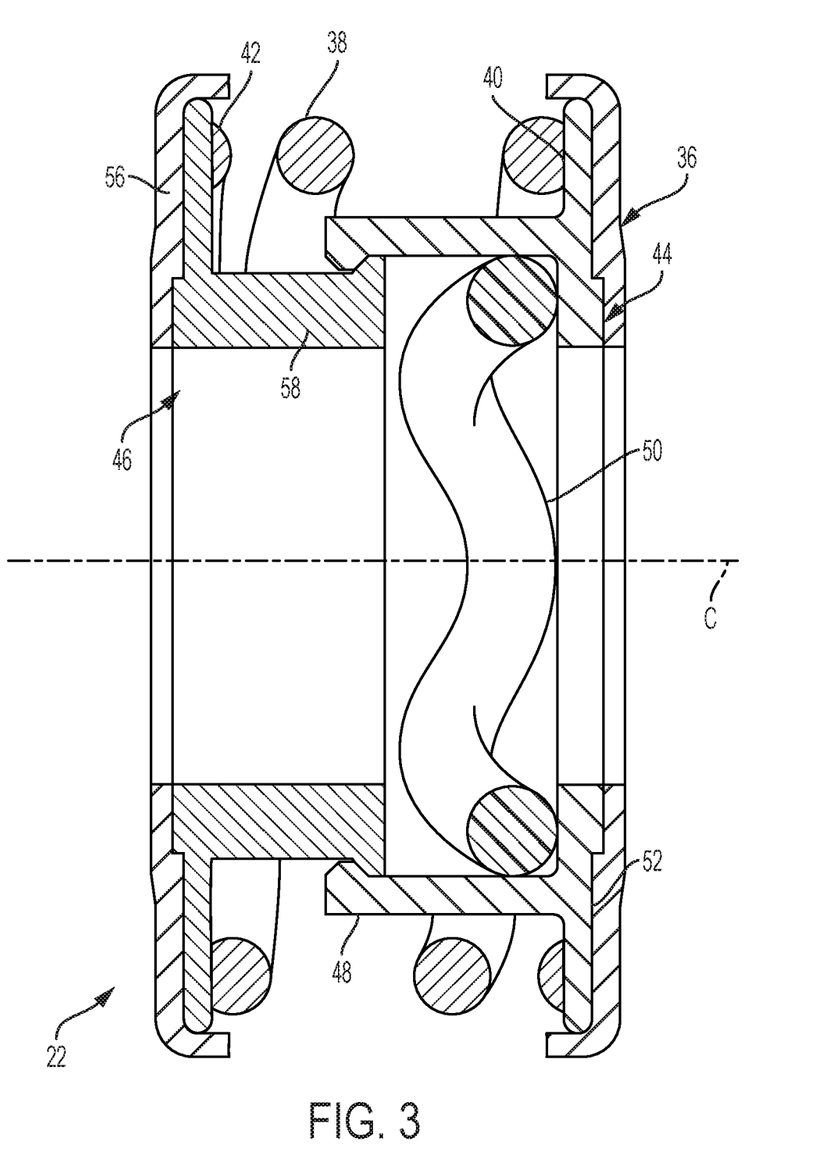
FIG. 3 is a cross section of the axial bumper device.
Figure 4:
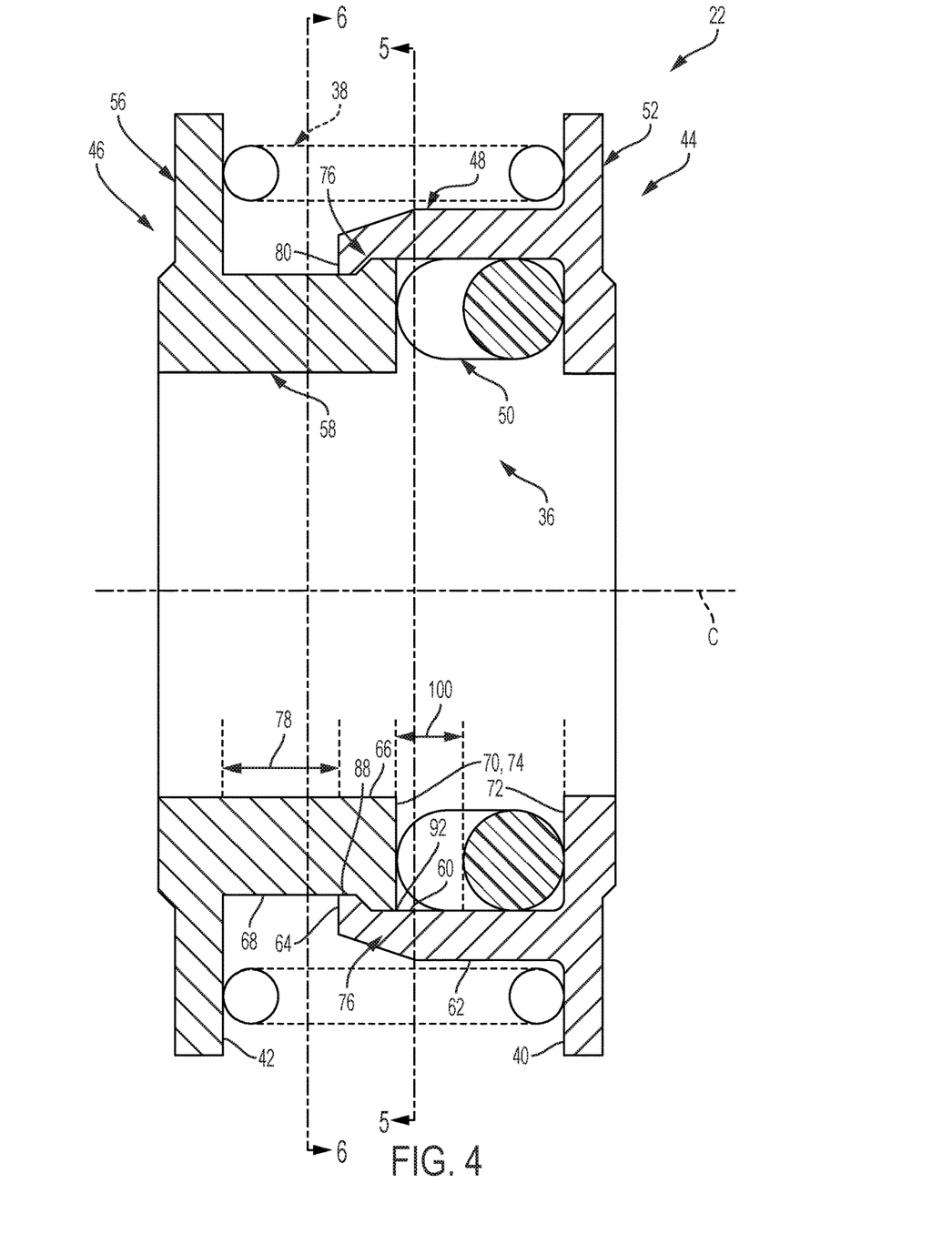
FIG. 4 is an enlarged cross section of the axial bumper device with portions removed.

Referring to FIGS. 3 and 4, the bearing isolator device 22 may include an axial load bearing assembly 36 and a resilient member 38 that may be a coiled, metallic, spring in biased contact between two axially opposing surfaces or spring seats 40, 42 that may be annular in shape. The axial load bearing assembly 36 may include a first member 44, a second member 46, a jacket 48 and resilient ring 50, which may all be substantially concentrically located about the shaft 26 and/or centerline C. In one embodiment, the first member 44 may axially abut the bearing 28, and the second member 46 may axially abut the axially opposing flange 34. It is further contemplated and understood that the resilient member 38 may be any structure constructed and arranged to exert a biasing force that resists compression along the centerline C between the first and second members 44, 46.

The first member 44 may include a base portion 52 and the jacket 48. The base portion 52 may be substantially annular in shape, and may be in axial contact (i.e., butted against) the bearing 28 on one side and carries the spring seat 40 on an opposite side. The jacket 48 may be circumferentially continuous, may be substantially cylindrical in shape, may be disposed radially inward of the spring seat 40, and may project axially outward from the base portion 52 away from the bearing 28 and generally toward the second member 46. The second member 46 may include a base segment 56 and a sleeve 58. The base segment 56 may be substantially annular in shape, and may be in axial contact (i.e., butted against) the flange 34 of the shaft 26 on one side and carries the spring seat 42 on an opposite side. The sleeve 58 may be circumferentially continuous, may be substantially cylindrical in shape, may be disposed radially inward of the spring seat 42, and may project axially outward from the base segment 56 away from the flange 34 of the shaft 26 and generally toward the first member 44.

In one example, the jacket 48 of the first member 44 may be generally disposed radially outward from the sleeve 58 of the second member 46. The jacket 48 and sleeve 58 may overlap one-another axially and by varying amounts during operation. That is, as the axial bumper device 22 compresses axially, the jacket 48 and sleeve 58 overlap by an increasing degree. The jacket 48 may include an inner face 60, an opposite outer face 62 and a distal end 64. The inner face 60 may be circumferentially continuous and/or cylindrical, and may face radially inward toward the resilient ring 50. The outer face 62 may be circumferentially continuous and/or cylindrical, and may face radially outward toward the spring 38. The distal end 64 may generally span radially between the inner and outer faces 60, 62, and may generally oppose the base segment 56 of the second member 46. The sleeve 58 may include an inner face 66, an opposite outer face 68 and a distal end 70. The inner face 66 may be circumferentially continuous and/or cylindrical, and may face radially inward toward the shaft 26. The outer face 68 may be circumferentially continuous and/or cylindrical, and may face radially outward toward the spring 38 and inner face 60 of the jacket 48.

The base portion 52 of the first member 44 may include or carry a surface or ring seat 72 that may be disposed radially inward of the jacket 48. The sleeve 58 of the second member 46 may include or carry a surface or ring seat 74 that axially opposes the ring seat 72. The ring 50 is disposed between the seats 72, 74 for axial compression.

When the axial bumper device 22 is fully assembled and in an extended state (i.e. as illustrated in FIG. 4), the spring 38 may exert a reduced load upon the opposing spring seats 40, 42. Similarly and when the axial bumper device 22 is in the extended state, the ring 50 may exert a reduced load upon the opposing ring seats 72, 74.

Figure 5:
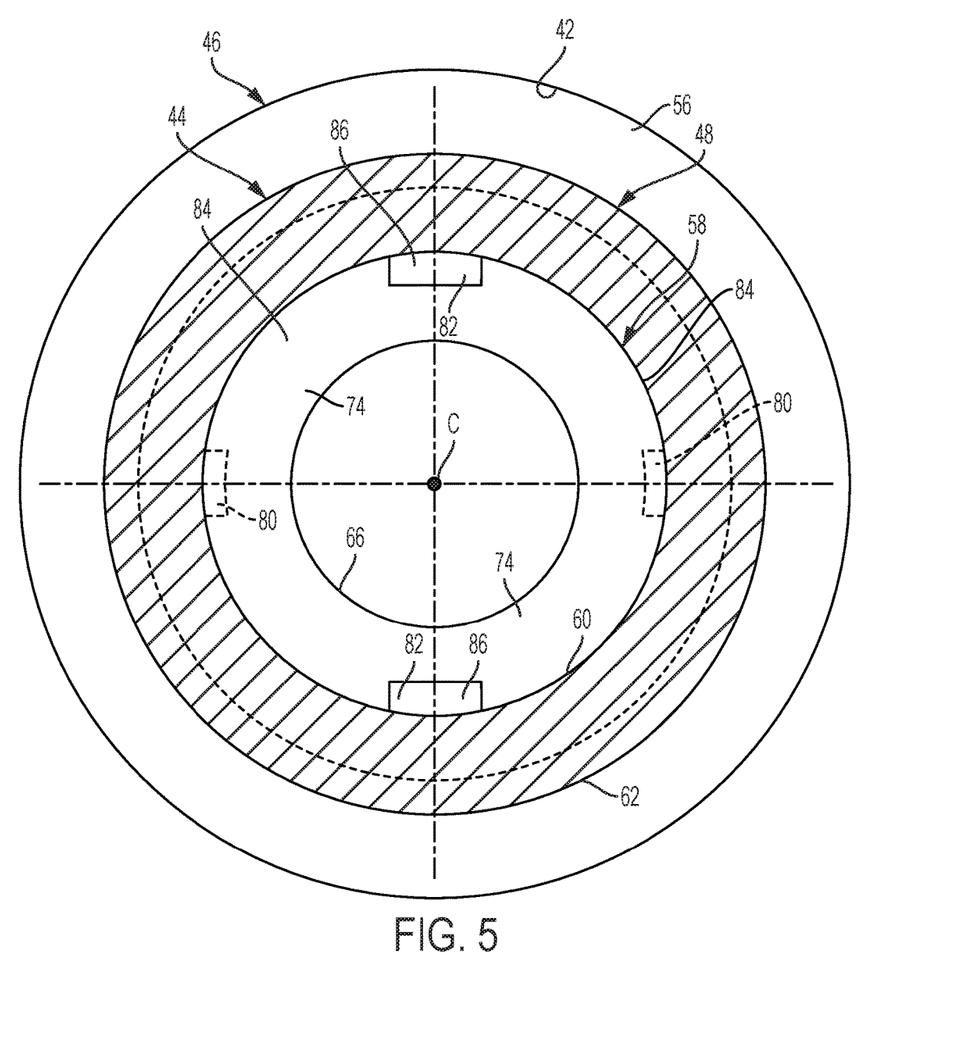
FIG. 5 is an axial view of a first member of the axial bumper device viewing in the direction of arrow 5 in FIG. 4.
Figure 6:
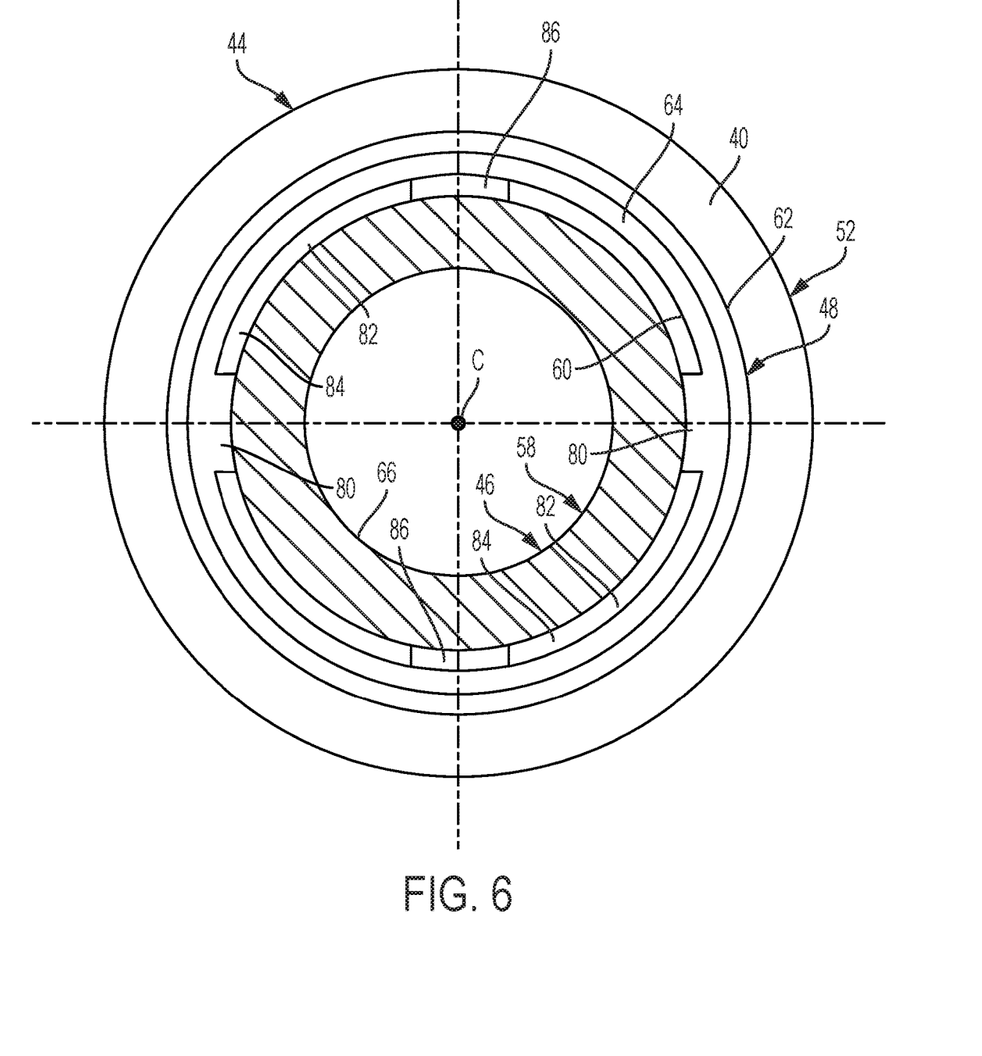
FIG. 6 is an axial view of a second member of the axial bumper device viewing in the direction of arrow 6 in FIG. 4.

Referring to FIGS. 4 through 6, in one embodiment, the axial bumper device 22 may include one or more retention and/or alignment features 76 (i.e., index feature) to aid in assembly, alignment, and retention of the axial bumper device 22 in a functional configuration and to further define an axial path of travel (see arrow 78 in FIG. 4) for the axial bumper device 22. The index feature 76 may include one or more circumferentially spaced tabs 80 (i.e., two illustrated) and associated notches 82 (see FIG. 6) carried by the jacket 48 of the first member 44, and corresponding tabs 84 and associated notches 86 carried by the sleeve 58 of the second member 46. The tabs 80, 84, and associated notches 82, 86 are generally located at the distal ends of the respective jacket 48 and sleeve 58.

The tabs 80 of the index feature 76 may project radially inward from a distal end of the jacket 48, and are generally spaced circumferentially apart from one-another by the notches 82. That is, the circumferential boundaries of the notches 82 are defined by the adjacent tabs 80. In the present example, the notches 82 may have a circumferential length that is substantially greater than a circumferential length of the tabs 80. The tabs 84 of the index feature 76 may project radially outward from a distal end of the sleeve 58, and are generally spaced circumferentially apart from one-another by the notches 86. That is, the circumferential boundaries of the notches 86 are defined by the adjacent tabs 84. In the present example, the notches 86 may have a circumferential length that is substantially less than a circumferential length of the tabs 84. The circumferential length of the tabs 80 may be about equal to the circumferential length of the notches 86, and the circumferential length of the tabs 84 may be about equal to the circumferential length of the notches 82.

During assembly of the axial bumper device 22, the tabs 80 associated with the first member 44 are circumferentially aligned to the notches 86 associated with the second member 46; and/or, the tabs 84 associated with the second member are circumferentially aligned to the notches 82 of the first member 44. Once aligned, the members 44, 46 may be moved axially together (i.e., toward a compressed state) so that the tabs 80, 84 move axially through the associated notches 82, 86 (i.e., as shown in FIGS. 5 and 6, in an aligned but unlocked state). The members 44, 46 may then be rotated with respect to one-another thereby circumferentially aligning the tabs 80 to the tabs 84 (i.e., an axially locked state). When the axial bumper device 22 is assembled and in an extended state, the axial contact between the tabs 80, 84 prevent the members 44, 46 from separating due to any axial loads produced by the spring 38 and/or ring 50. In one embodiment, the maximum axial path of travel 78 (i.e., distance) may be measured between the distal end 64 of the jacket 48 and the surface 42 of the base segment 56 when the device 22 is in the extended state.

During operation of the axial bumper device 22, a distal end face 88 of each tab 80 (see FIGS. 4 and 6), which may face radially inward, may be in sliding contact with the outer face 68 of the sleeve 58. This sliding contact constrains the relative movement of the first member 44 relative to the second member 46 and may at least in-part define the axial path of travel 78 along the centerline C. In one example, a distal end face 90 of each tab 84, which may face radially outward, and the inner face 60 of the jacket 48 may define a radial clearance 92. The radial clearance 92 may be configured to avoid interference between the tabs 84 and the jacket 48 when the first and second members 44, 46 are moving axially within the path of travel 78.

Figure 7:
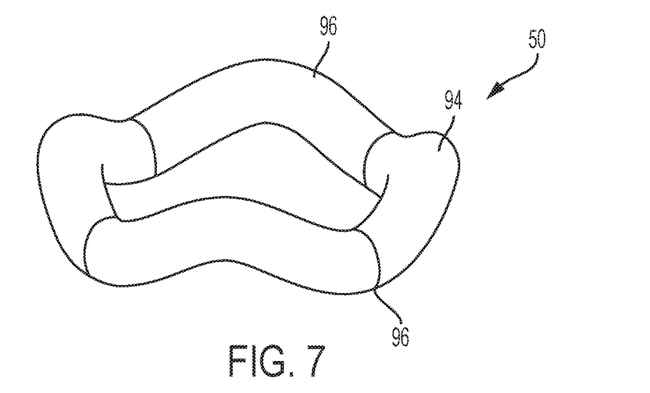
FIG. 7 is a perspective view of a ring of the axial bumper device.
Figure 8:
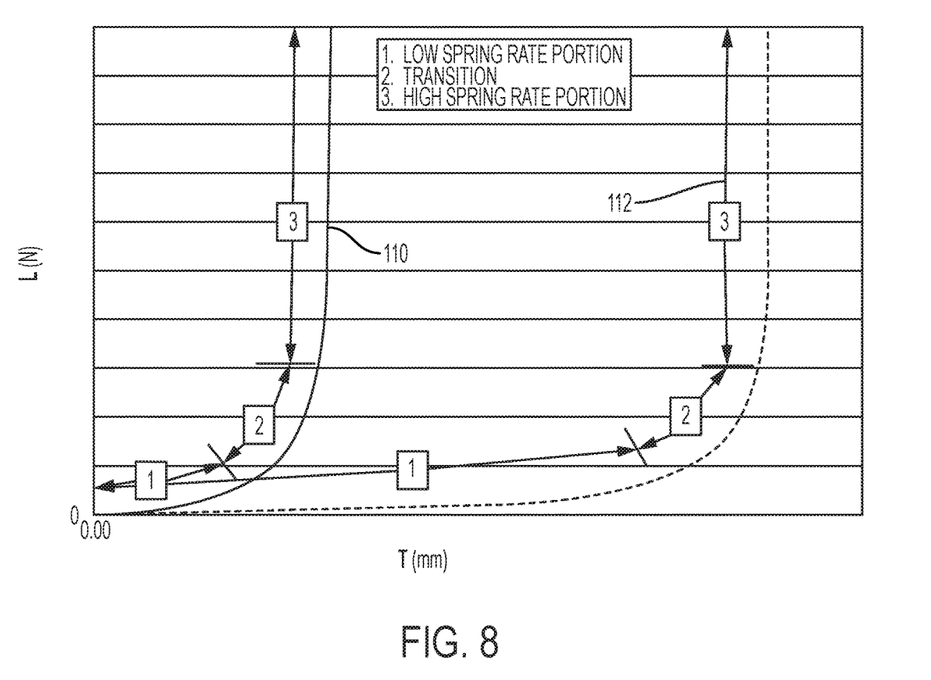
FIG. 8 is a spring curve rate chart.

Referring to FIGS. 3 and 7, the ring 50 of the axial load bearing assembly 36 may function as a bumper and may further buffer axial movement of the worm gear shaft 26 along a desired, pre-determined, load profile as a function of axial displacement (see FIG. 8). The ring 50 may be resiliently compressible, may be made of an elastomeric material, and may further be a corrugated ring such as, for example, a wave-form o-ring. In one embodiment, the corrugated o-ring 50 may have a circular cross section that generally remains the same at all circumferential locations about the centerline C. In one example, the longitude of the o-ring 50 may generally be sinusoidal in shape. That is, the o-ring 50 may include a plurality of wave segments 94 connected end-to-end to from a continuous ring. Each wave segment 94 has a peak 96, wherein circumferentially adjacent peaks 96 project in axially opposite directions with respect to centerline C. When the axial load bearing assembly 36 is in the extended state, the alternating peaks 96 may be in slight contact with the opposing seats 72, 74, and any biasing force exerted against the seats 72, 74 to resist assembly 36 compression may be zero or minimal.

The wave-form o-ring 50 may have a longitudinal length (measured both circumferentially and axially) that is greater than a circumferential length of the cylindrical face 60. When the axial load bearing assembly 36 is in the extended state, the o-ring 50 may be spaced slightly radially inward of the face 60 of the jacket 48; or, may be in slight contact with the face 60.

In operation and as the axial bumper device 22 moves axially from the extended state and toward the compressed state, the second member 46 may move axially away from the shaft flange 34 (see FIG. 2) and toward the first member 44 that may remain in contact with the bearing 28. With this axial displacement, the spring seats 40, 42 move axially toward one-another compressing the coiled spring 38 and against the biasing force of the spring. Simultaneously and/or as the members 44, 46 continue to move axially toward one-another, the corrugated o-ring 50 continues to compress axially and the o-ring biasing force exerted against the member movement increases as the wave segments 94 generally flatten.

With the flattening of the wave segments 94 axially between the seats 72, 74, the o-ring 50 attempts to expand radially outward causing the o-ring 50 to exert an outward directed, radial, biasing force against the cylindrical face 60 of the jacket 48. Moreover, as the wave segments 94 are flattened, the o-ring 50 may compress circumferentially along its own length (i.e., along its own cross sectional axis), creating an internal circumferential biasing force. More specifically, the circumferential compression of the o-ring 50 may generally be view under a column compression model of equation(s) that would apply even though the 'column' is wrapped around a circle. It may be this column compression down the axis of the o-ring 50 (i.e., axis running through and all along the center of the cross section) that sets up at least a portion of the compression stress that forces the o-ring 50 to return back to its original wave shape, and not so much the bending of the wave. Stated in yet another way, because each wave segment 94 is getting compressed shorter in length during the flattening process, the circumferential load/force is created (i.e., not just the fact that the wave segment is being bent flat).

The final stressed condition is volumetric hydraulic compression dictated by the constraining geometry. The radial and circumferential biasing forces may be translated into an axial force that works against further movement of the members 44, 46 axially toward one-another. Once the wave portions 94 are generally flattened, the members 44, 46 may still move axially toward one-another, but at a short distance, with an ever increasing high resistive spring-rate. The general design of the wave-form o-ring 50 enables a greater degree of axial displacement with a more controlled and limited, compression resisting, load produced by the spring 38 and wave-form o-ring 50.

Referring to FIG. 8, a load L verse axial displacement or travel T graph is illustrated to depict two spring rate curves 110, 112. Each spring rate curve 110, 112 may be described as having two distinctly different portions (low spring rate and high spring rate) with a transition between the two portions. The desired curve(s) will have a large amount of axial movement at a low spring rate compression and then a short transition to a small amount of axial displacement at a high compression rate.

In one example, the resilient member 38 is a metallic coil spring configured to provide a force of between approximately two (2) Newtons and approximately one-hundred (100) Newtons as the resilient member 38 is compressed in connection with the movement of the second member 46 relative to the first member 44 along a first portion (see arrow 100 in FIG. 4) of the path of travel 78 corresponding to a worm axis stroke (i.e., operational range within the path of travel 78) that is between approximately zero (0) mm to approximately five (5) mm.

In another example, the resilient member 38 is configured to provide a force of between approximately five (5) Newtons and one-hundred (100) Newtons as the resilient member 38 is compressed in connection with the movement of the second member 46 relative to the first member 44 along the first portion 140 of the path of travel 78 corresponding to a worm axis stroke of between about zero (0) mm to two (2) mm.

Figure 9:
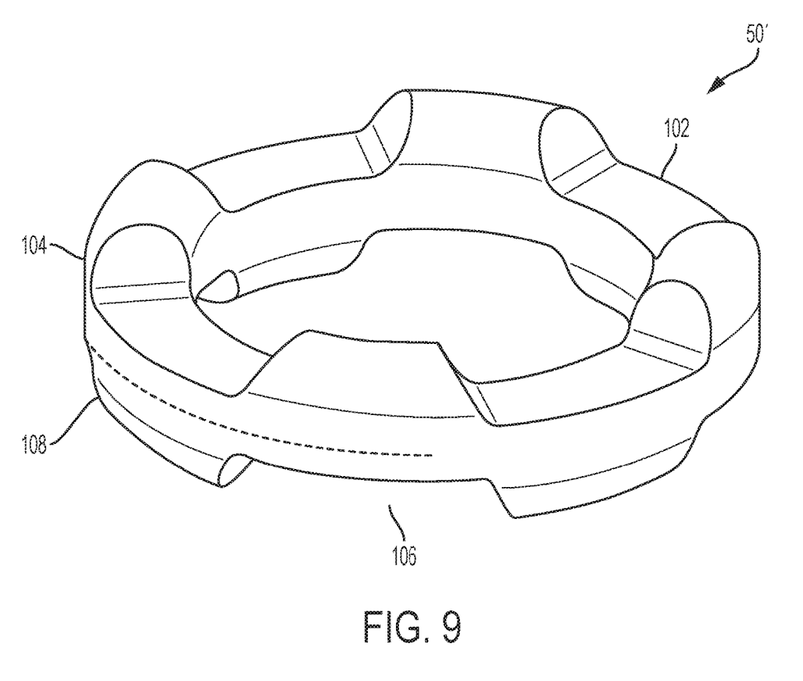
FIG. 9 is a perspective view of a second embodiment of the ring.

Referring to FIG. 9, a second embodiment of a corrugated ring is illustrated wherein like elements to the first embodiment have like identifying numerals except with the addition of a prime symbol suffix. A corrugated ring or o-ring 50' may have a cross section that is not circular. Instead, the cross section may generally be oval and elongated in an axial direction. The o-ring 50' may include divits 102 spaced circumferentially from one-another in a first axial portion 104 of the o-ring 50' and a similar pattern of divits 106 in an opposite second axial portion 108 of the o-ring 50'. The divits 102 and divits 106 are configured to be circumferentially offset from one-another thus forming the wave geometry. The o-ring geometry may also be any other shape that simplifies manufacturing and still generally has the waved form.

Figure 10:
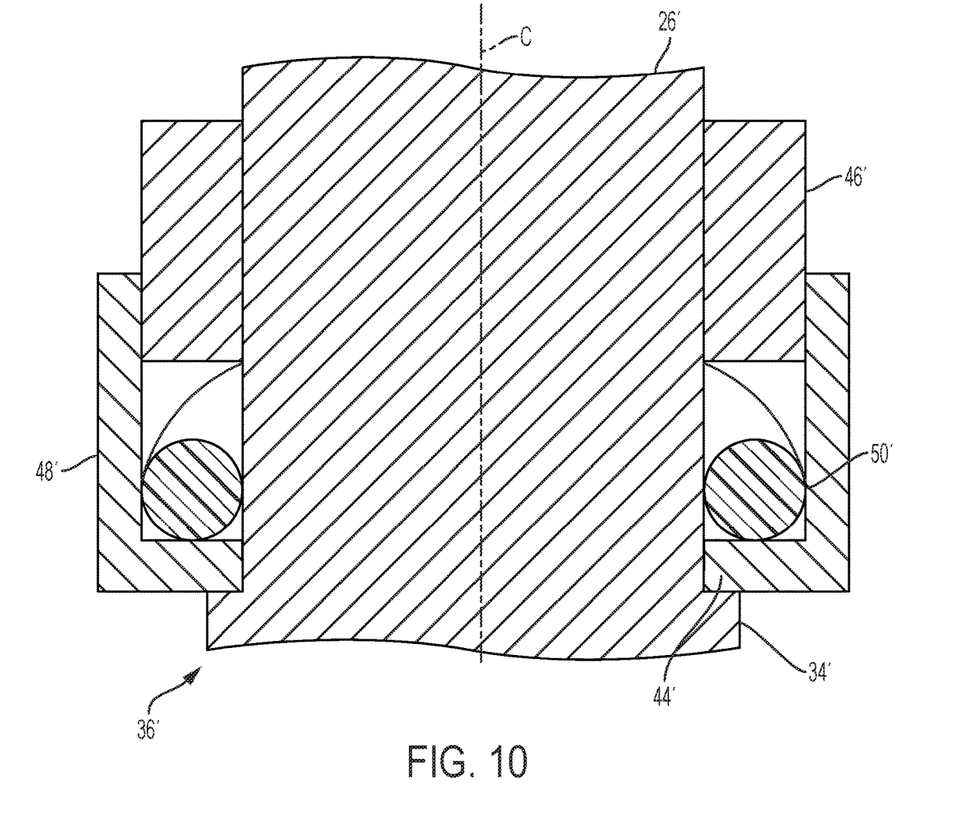
FIG. 10 is a cross section of a second embodiment of an axial load bearing assembly of the axial bumper device.

Referring to FIG. 10, a second embodiment of an axial load bearing assembly 36 is illustrated wherein like elements to the first embodiment have like identifying numerals except with the addition of a prime symbol suffix. An axial load bearing assembly 36' includes a first member 44', a second member 46', and a wave-form o-ring 50'. A shaft 26' (e.g., rotating motor shaft) may extend through the members 44', 46' along a centerline C. The shaft 26' may include a flange 34' that project radially outward and axially abuts the first member 44'. The second member 46' may be fixed and/or stationary. For example, the second member 46' may be part of a motor housing. When the shaft 26' shifts axially, the flange 34' bears upon the first member 44', causing the first member to move toward the second member 46', thereby causing the wave-form o-ring 50' to compress axially and become biased against the outer jacket 48' of the first member 44'.

U.S. Pat. No. 9,051,968, issued Jun. 9, 2015 is herein incorporated by reference in its entirety.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. An axial load bearing assembly comprising:
a first member including a first surface facing axially with respect to a centerline;
a second member constructed and arranged to move axially with respect to the first member between an extended state and a compressed state, the second member including a second surface axially opposing the first surface;
a jacket engaged to one of the first and second members and including a face facing radially inward; and
an elastomeric ring disposed axially between the first and second members for axial compression, and wherein the elastomeric ring is in biased contact with the face at least when in the compressed state preventing radial expansion of the elastomeric ring during axial compression, wherein the elastomeric ring is a wave-form o-ring.

2. The axial load bearing assembly set forth in claim 1, wherein the elastomeric ring includes an outer longitudinal length that is greater than a circumferential length of the face.

3. The axial load bearing assembly set forth in claim 2, wherein the first member is disposed concentrically to the second member and the face is cylindrical and centered to the centerline.

4. The axial load bearing assembly set forth in claim 3, wherein the second member includes a shaft axially extending through the first member.

5. The axial load bearing assembly set forth in claim 4, wherein the first and second surfaces are annular.

6. An axial load bearing assembly comprising:
a first member including a first surface facing axially with respect to a centerline;
a second member constructed and arranged to move axially with respect to the first member between an extended state and a compressed state, the second member including a second surface axially opposing the first surface;
a jacket engaged to one of the first and second members and including a face facing radially inward; and
an elastomeric ring disposed axially between the first and second members for axial compression, and wherein the elastomeric ring is in biased contact with the face at least when in the compressed state preventing radial expansion of the elastomeric ring during axial compression, wherein the elastomeric ring is a corrugated ring that is in intermittent circumferential contact with at least one of the first and second surfaces when in the extended state and is in circumferentially continuous contact with the at least one of the first and second surfaces as the second member moves from the extended state and toward the compressed state.

7. An axial bumper device comprising:
a first member extending about a centerline;
a second member axially opposed to the first member and constructed and arranged to move axially with respect to the first member;
a resilient member axially disposed between and in biasing contact with the first and second members; and
a corrugated ring axially disposed between and in biased contact with the first and second members, wherein the resilient member is a spring disposed axially to and spaced radially outward from the corrugated ring, and the corrugated ring is an elastomeric o-ring.

8. The axial bumper device set forth in claim 7, wherein the first member includes a base portion and a circumferentially continuous jacket projecting axially from the base portion and toward the second member, and wherein the jacket is disposed radially between the resilient member and the corrugated ring.

9. The axial bumper device set forth in claim 8, wherein the base portion includes a first annular seat in biased, axial, contact with the corrugated ring, and the jacket includes a face facing radially inward and in biased contact with the corrugated ring.

10. The axial bumper device set forth in claim 9, wherein the corrugated ring includes a circumferential length that is greater than a circumferential length of the face.

11. The axial bumper device set forth in claim 9, wherein the second member includes a base segment and a circumferentially continuous sleeve projecting axially from the base portion and toward the first member, the sleeve including a second annular seat at a distal end in biased contact with the corrugated ring.

12. The axial bumper device set forth in claim 11, wherein the sleeve is disposed radially inward of the jacket.

13. The axial bumper device set forth in claim 12, wherein the base segment includes a third seat disposed radially outward of the sleeve and in biased contact with the resilient member.

14. The axial bumper device set forth in claim 13, wherein the base portion includes a fourth seat disposed radially outward of the jacket and in biased contact with the resilient member.

15. The axial bumper device set forth in claim 7, wherein the axial bumper device is a bearing isolator device.

16. An electric power steering gear box apparatus for a vehicle comprising:
   an outer casing;
   an electric motor supported by the outer casing and including a motor shaft configured to rotate about a centerline;
   a worm shaft gear rotatably supported by the outer casing and connected to the motor shaft, and wherein the worm shaft gear is constructed and arranged to shift axially with respect to the motor shaft; and
   an axial load bearing assembly including a base portion in fixed axial relation to one of the outer casing and the worm shaft gear, a base segment in fixed axial relation to the other of the outer casing and the worm shaft gear, a wave-form o-ring disposed axially between the base portion and the base segment for compression, and a jacket projecting axially outward from one of the base portion and the base segment and toward the other of the base portion and the base segment, and wherein the waveform o-ring is in biased contact with a circumferentially continuous face of the jacket that faces radially inward.

17. The electric power steering gear box apparatus set forth in claim 16, wherein the wave-form o-ring includes a longitudinal length measured both circumferentially and axially, and that is greater than a circumferential length of the face.

* * * * *